US011204000B2

(12) United States Patent
O'Brien et al.

(10) Patent No.: US 11,204,000 B2
(45) Date of Patent: Dec. 21, 2021

(54) FLIGHT VEHICLE ENGINE WITH FINNED INLET

(71) Applicant: Raytheon Company, Waltham, MA (US)

(72) Inventors: Timothy F. O'Brien, Vail, AZ (US); Faure Malo-Molina, Tucson, AZ (US); Timothy Raymond Conners, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 387 days.

(21) Appl. No.: 15/468,441

(22) Filed: Mar. 24, 2017

(65) Prior Publication Data

US 2018/0274486 A1    Sep. 27, 2018

(51) Int. Cl.
*F02K 7/00* (2006.01)
*F02K 7/10* (2006.01)
(Continued)

(52) U.S. Cl.
CPC ............... *F02K 7/10* (2013.01); *B64C 30/00* (2013.01); *B64D 33/02* (2013.01); *F02C 7/04* (2013.01);
(Continued)

(58) Field of Classification Search
CPC ..... F02K 7/10; F02K 7/14; F02K 7/16; B64C 30/00; B64C 2230/26; B64D 27/16;
(Continued)

(56) References Cited

U.S. PATENT DOCUMENTS 2,694,357 A * 11/1954 Lee ........................... F02C 7/04
454/76
2,989,846 A    6/1961 Hausammann
(Continued)

FOREIGN PATENT DOCUMENTS

EP    1 445 465 A1    8/2004
EP    1 898 080 A2    3/2008
(Continued)

OTHER PUBLICATIONS

Maheswaran, T.G. et al, Computational Analysis The Effect of Micro Vortex Generator in E2R Scramjet Engine, May 2013, International Journal of Engineering Research & Technology (Year: 2013).*

(Continued)

*Primary Examiner* — Edwin Kang
(74) *Attorney, Agent, or Firm* — Renner, Otto, Boisselle & Sklar, LLP

(57) ABSTRACT

An air inlet for a flight vehicle engine includes at least one fin, at least partially upstream of a throat of the engine. The fin protrudes into a flow channel, extending beyond a boundary layer into the main airstream in the inlet. The fin causes mixing in the flow, bringing high-momentum flow into areas of the flow channel containing low-momentum flow by aggregating the boundary layer and causing it to lift from the surface. The fin may have a width and/or height that varies along its length in the flow direction, which may allow it to shape the flow around it in predictable ways, without resulting in excessive drag.

21 Claims, 5 Drawing Sheets

(51) Int. Cl.
  *B64D 33/02* (2006.01)
  *B64C 30/00* (2006.01)
  *F02C 7/04* (2006.01)
(52) U.S. Cl.
  CPC ............ *F02K 7/00* (2013.01); *B64C 2230/26* (2013.01); *B64D 2033/026* (2013.01); *B64D 2033/0226* (2013.01); *F05D 2220/10* (2013.01); *F05D 2250/14* (2013.01); *F05D 2250/51* (2013.01); *Y02T 50/60* (2013.01)
(58) Field of Classification Search
  CPC ............ B64D 33/02; B64D 2033/0226; B64D 2033/026; F05D 2220/10; F05D 2220/14; F05D 2220/51
  See application file for complete search history.

(56) References Cited

U.S. PATENT DOCUMENTS

| | | | |
|---|---|---|---|
| 3,741,285 A * | 6/1973 | Kuethe | F28F 13/12 165/181 |
| 3,777,488 A * | 12/1973 | Gross | F02K 7/10 244/53 B |
| 5,058,837 A * | 10/1991 | Wheeler | B64C 23/06 244/200.1 |
| 5,082,206 A | 1/1992 | Kutschenreuter, Jr. et al. | |
| 5,114,099 A * | 5/1992 | Gao | B64C 21/10 244/130 |
| 5,881,758 A | 3/1999 | Koncsek et al. | |
| 6,793,175 B1 | 9/2004 | Sanders et al. | |
| 7,048,229 B2 | 5/2006 | Sanders et al. | |
| 8,434,723 B2 | 5/2013 | Simpson et al. | |
| 8,656,957 B2 | 2/2014 | Babinsky et al. | |
| 9,447,731 B1 | 9/2016 | Adamson et al. | |
| 2006/0107648 A1 | 5/2006 | Bulman et al. | |
| 2007/0235590 A1 * | 10/2007 | Kokoshkin | B62D 35/00 244/130 |
| 2008/0060361 A1 | 3/2008 | Morrison et al. | |
| 2008/0092519 A1 | 4/2008 | Bulman | |
| 2008/0128547 A1 | 6/2008 | Pederson et al. | |
| 2008/0283677 A1 | 11/2008 | Pederson et al. | |
| 2010/0288379 A1 * | 11/2010 | Dahm | B64C 21/10 137/561 R |
| 2012/0018021 A1 * | 1/2012 | Babinsky | F15C 1/16 137/808 |
| 2012/0049008 A1 | 3/2012 | Domel et al. | |
| 2014/0182697 A1 | 7/2014 | Davidenko et al. | |
| 2014/0224940 A1 | 8/2014 | Rybalko | |
| 2014/0224949 A1 | 8/2014 | Rybalko et al. | |
| 2018/0347461 A1 * | 12/2018 | Cicchini | F02K 7/10 |

FOREIGN PATENT DOCUMENTS

| | | |
|---|---|---|
| GB | 911 074 | 11/1962 |
| RU | 2 343 297 | 1/2009 |
| WO | 2017/158857 A1 | 9/2017 |

OTHER PUBLICATIONS

Joseph, Katz, Aerodynamics of Large-Scale Vortex Generator in Ground Effect, 2008 (Year: 2008).*
International Search Report and Written Opinion for corresponding International Application No. PCT/US2017/056293 dated Jan. 15, 2018.
Pending claims of co-pending U.S. Appl. No. 15/615,146, filed Jun. 6, 2017.
Pending claims of co-pending U.S. Appl. No. 15/615,152, filed Jun. 6, 2017.
Sabean et al., "Computational Optimization of a Hypersonic Rectangular-to-Circular Inlet", Journal of Propulsion and Power, vol. 17, No. 3, May-Jun. 2001, pp. 571-578.
Sabean et al., "Optimization of a Hypersonic Inlet with a Rectangular to Circular Transition", American Institute of Aeronautics & Astronautics, AIAA 99-0612, 1999, pp. 1-9.
Guonko, et al. "Numerical investigation of flow over two sweepback wedges at M=4 and 6," Thermophysics and Aeromechanics, vol. 20, No. 2, 2013, pp. 179-193.
Settles et al., "Investigation of Three-Dimensional Shock/Boundary-Layer Interactions at Swept Compression Corners", AIAA Journal, vol. 18, No. 7, Jul. 1980, pp. 779-785.
Settles et al., "Cylindrical and Conical Flow Regimes of Three-Dimensional Shock/Boundary-Layer Interactions", AIAA Journal, vol. 22, Feb. 1984, pp. 194-200.
Inger, "Supersonic Viscous-Inviscid Interaction of a Swept Ramp with a Turbulent Boundary Layer", AIAA-85-1669, Jul. 1985, 60 pages.
Stalker, "Spanwise Propagation of Disturbances in Swept Shock Wave-Boundary Layer Interactions", AIAA-82-0988, Jun. 1982, 9 pages.
Zheltovodov et al., "Shock Wave-Boundary-Layer Interactions", Chapter 5.3.4 "Swept Compression Ramp; Interaction and Its Modeling", 2011, pp. 230-237.

* cited by examiner

FLIGHT VEHICLE ENGINE WITH FINNED INLET

FIELD OF THE INVENTION

The invention is in the field of engines for flight vehicles such as airplanes or missiles.

DESCRIPTION OF THE RELATED ART

High-speed air-breathing engines, such as ramjets and scramjets, include inlets that capture and compress air to be used in combustion. The air that passes through the inlet is then directed downstream to an isolator, and from there to a combustor.

There has been a general need to manage the flow within the inlet, particularly the boundary layer that forms along the walls of the inlet. Management of a thick boundary layer from a high-speed inlet compression surface usually involves a large amount of mass flow removal via a boundary layer diverter, boundary layer bleed, or placement of a bump or bumps in the flow ahead of the inlet. These systems are often complex and occupy a significant amount of internal volume and can produce a substantial penalty in performance.

SUMMARY OF THE INVENTION

A flight vehicle engine inlet includes one or more fins that displace or break apart the boundary layer in the inlet. This avoids the need for other interventions such as a large amount of mass removal via a bleed system, or complex and voluminous secondary systems. This approach results in higher quality (i.e. less distorted) flow at the combustor entrance, improved operability, more captured mass flow, less system weight, and increased range and net thrust.

According to an aspect of the invention, a flight vehicle includes: a fuselage; and an engine mechanically coupled to the fuselage. The engine includes: an air inlet; an isolator downstream of the air inlet; and a combustor downstream of the isolator. The air inlet compresses incoming airflow through a flow channel defined by the air inlet, down to a throat of minimum cross-section area. The air inlet includes a fin protruding into the flow channel, with at least part of the fin upstream of the throat.

According to an embodiment of any paragraph(s) of this summary, all of the fin is upstream of the throat.

According to an embodiment of any paragraph(s) of this summary, the fin extends into the throat.

According to an embodiment of any paragraph(s) of this summary, the fin protrudes into the flow channel to a height of at least the boundary layer thickness, along an inner wall of the inlet that defines the flow channel.

According to an embodiment of any paragraph(s) of this summary, the fin has a maximum height that is at least three-quarters of the distance across the inner walls of the inlet that define the flow channel.

According to an embodiment of any paragraph(s) of this summary, there is only a single fin in the inlet.

According to an embodiment of any paragraph(s) of this summary, there are multiple fins in the inlet.

According to an embodiment of any paragraph(s) of this summary, the multiple fins include a pair of fins side by side on an inner wall portion.

According to an embodiment of any paragraph(s) of this summary, there are no more than three fins in the inlet.

According to an embodiment of any paragraph(s) of this summary, the fin creates vortices that cause local flow mixing around and aft of the fin.

According to an embodiment of any paragraph(s) of this summary, the local flow mixing causes mixing between boundary layer flow along an inner wall of the inlet, and flow outside of the boundary, further away from the inner wall.

According to an embodiment of any paragraph(s) of this summary, the inlet is rectangular or hyper-elliptical in cross-section.

According to an embodiment of any paragraph(s) of this summary, the fin is located on a face of an inner wall of the inlet that is between two other inner walls of the inlet.

According to an embodiment of any paragraph(s) of this summary, the fin has a triangular cross section shape, in a direction perpendicular to a flow direction through the inlet.

According to an embodiment of any paragraph(s) of this summary, a height of the fin varies over a length of the fin.

According to an embodiment of any paragraph(s) of this summary, the height varies more slowly in an upstream part of the fin that is upstream of a peak height, than in a downstream part of the fin that is downstream of the peak height.

According to an embodiment of any paragraph(s) of this summary, the engine is a supersonic engine.

According to another aspect of the invention, a method of operating a flight vehicle engine includes: using a fin in an inlet of the engine to produce vortices that locally mix flow from outside a boundary layer into the boundary layer; wherein the fin extends beyond the boundary layer into a core of the flow.

According to still another aspect of the invention, a method of operating a flight vehicle engine includes: using a fin in an inlet of the engine to cause the boundary layer to aggregate then separate from the surface as a counter-rotating vortex pair; wherein the fin extends beyond the boundary layer into a core of the flow. The effect mentioned earlier may occur as part of an interaction between a cowl shock and a vortex downstream of the fin.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

An air inlet for a flight vehicle engine includes at least one fin, at least partially upstream of a throat of the engine. The fin protrudes into a flow channel, extending beyond a boundary layer into the main airstream in the inlet. The fin causes mixing in the flow, mixing high-momentum flow into areas of the flow channel with low-momentum flow. The fin may have a width and/or height that varies along its length in the flow direction, which may allow it to shape the flow around it in predictable ways, without resulting in excessive drag.

Figure 1:
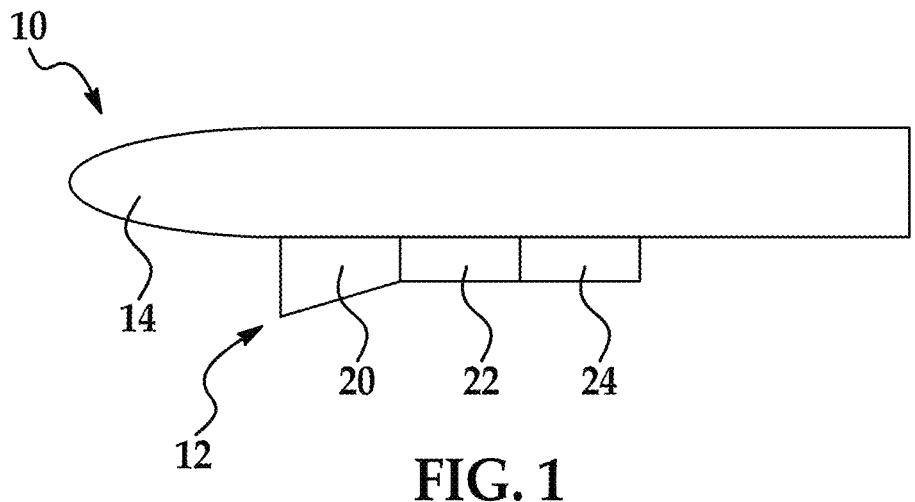
FIG. 1 is a schematic diagram of a flight vehicle according to an embodiment of the present invention.

FIG. 1 schematically shows an air vehicle 10 that is powered by an engine 12 that is mechanically coupled to a fuselage 14. The air vehicle 10 may be a missile, an unmanned aircraft (an unmanned aerial vehicle or UAV) or a manned aircraft. The air vehicle 10 may have any of a variety of sizes, and any of a variety of operating conditions. In much of the description below the air vehicle 10 is described in terms of a hypersonic air vehicle, with hypersonic referring to operation having a Mach number of at least four. However the air vehicle 10 may operate at lower supersonic speeds (Mach number greater than one), or even at subsonic speeds.

The engine 12 may be coupled to the fuselage 14 in any of a variety ways, including parts of the engine 12 being integrally formed with parts of the fuselage 14. The fuselage 14 may have any of a variety of suitable shapes, and may include additional components for carrying out one or more operations of the air vehicle 10. Such additional components, to give a few non-limiting examples, may include control systems (such as for steering), lift-producing and/or control surfaces (such as wings, fins, or canards, either fixed in position or movable in whole or in part), communication systems, sensors or other data-collecting systems, and/or any of a variety of payloads.

Figure 2:
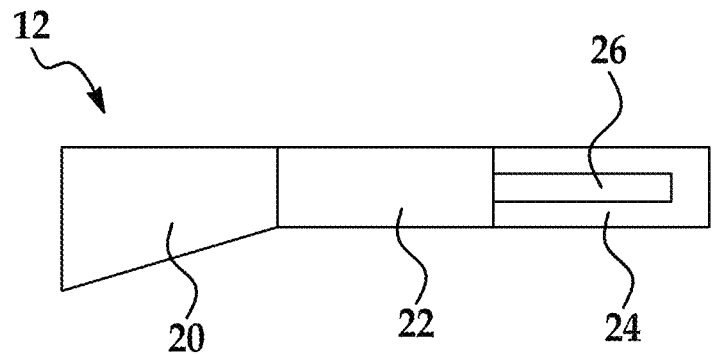
FIG. 2 is a diagram showing components of an engine of the flight vehicle of FIG. 1.

With reference in addition to FIG. 2, the engine 12 includes an air inlet 20, an isolator or diffuser 22, and a combustor 24. The air inlet 20 takes in air from the free air stream and compresses the air, with one or more shocks perhaps occurring as the flow is compressed. The compressed air then exits the air inlet 20 to enter into the isolator 22. A throat 26, at the boundary between the air inlet 20 and the isolator 22, may be a minimum area location within the engine 12. The isolator 22 functions to keep the shocks stable, and to provide more uniform flow at its downstream end, where the air passes from the isolator 22 to the combustor 24. In the combustor 24 fuel is added to the air flow and combustion occurs, producing thrust from the engine 12, which is used to power the air vehicle 10. Combustion products are exhausted from a downstream end of the combustor 24.

The inlet 20 may have any of a variety of suitable shapes, for example being round, elliptical, or rectangular. The isolator 22 may have a general shape that makes the transition between a rectangular or elliptical shape of the inlet 20 (for example) to a round shape for the combustor 24. Many variations for the general shape are possible.

The combustor 24 may be any of variety of suitable devices for burning a fuel-air mixture and producing thrust. For example the combustor 24 (and/or the engine 12) may be a ramjet, a scramjet, constant volume combustor, or perhaps a gas turbine. In FIG. 2 the combustor 24 is shown as having a turbine, but in many embodiments the combustor 24 has no turbine (or other moving parts), for example being a ramjet or scramjet.

Figure 3:
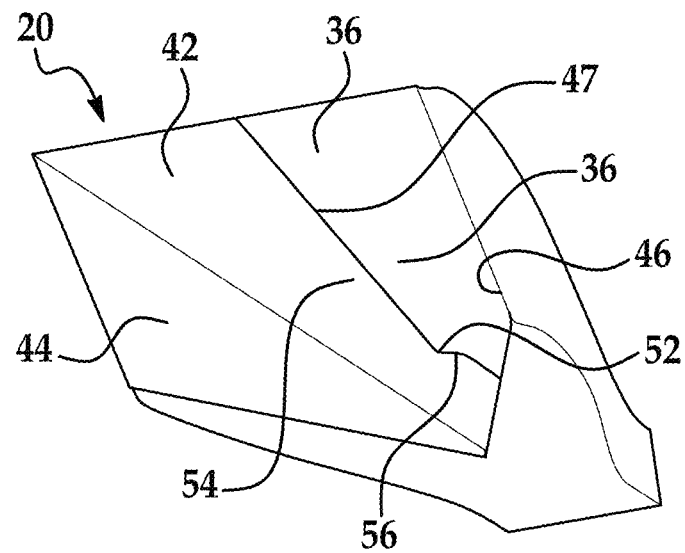
FIG. 3 is an oblique view of part of the inlet of the engine of FIG. 2.
Figure 4:
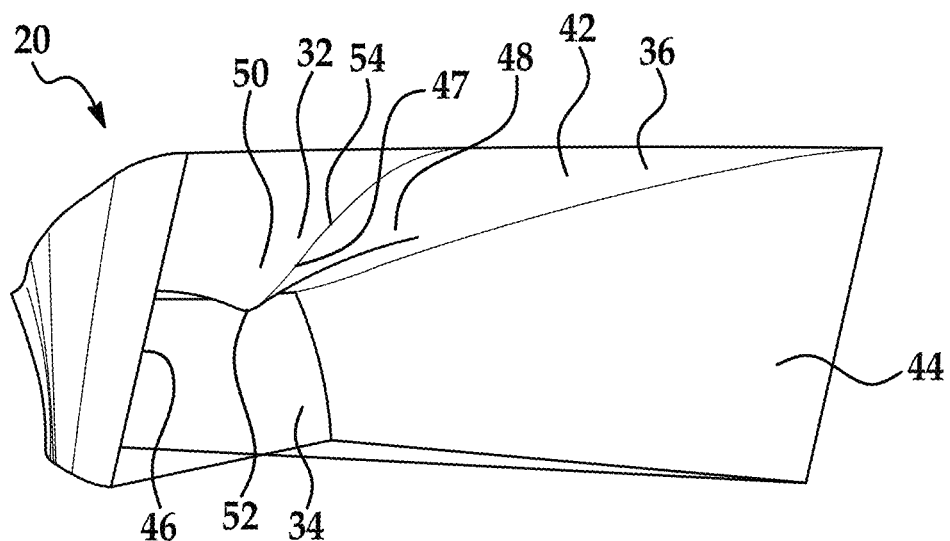
FIG. 4 is another oblique view of part of the inlet of the engine of FIG. 2.

Turning now to FIGS. 3 and 4, the inlet 20 includes a fin 32 that protrudes inward into a flow channel 34 that is defined by and surrounded by an inner wall 36 of the inlet 20. The fin 32 produces flow mixing as the flow separates around the fin 32 and then joins together again. The fin 32 rises from a portion 42 of the inner wall 36 which is between and angled relative to other portions 44 and 46 of the inner wall 36. The fin 32 may be considered part of the inner wall portion 42, a part that protrudes inward into the flow channel such that it protrudes further than adjoining parts of the inner wall portion 42 that are on opposite sides of the fin 32 in a direction perpendicular to both the flow direction through the channel 34, and the direction in which the fin 32 protrudes into the flow channel 34. For example, in the illustrated embodiment the fin 32 is higher than adjoining portions of the inner wall portion 42 on either side of it, forming a ridge that protrudes into the flow channel 34. To provide another example, in a circular inlet a fin would protrude inward in a radial direction, protruding relative to adjoining portions on either side circumferentially.

The fin 32 protrudes out of the inner wall portion 42 smoothly, without any abrupt changes or discontinuities in the slope of the fin 32, except perhaps at a spine 47 along the length of the fin 32. The spine 47 is where the fin 32 has its maximum protrusion into the flow channel 34, and the spine 47 may have a sharp edge that involves an abrupt change or discontinuity in slope.

The fin 32 may have curved walls 48 and 50 on either side of the spine 47. The walls 48 and 50 may be steeper close to the spine 47 and flatten out (reduce in slope) away from the spine 47.

The fin 32 may have a height (extent to which the fin 32 protrudes into the flow channel 34) that varies over the length of the fin 32, with the length of the fin 32 being in the direction of flow through the flow channel 34 (the longitudinal direction). The width of the fin 32 also may vary over the longitudinal extent of the fin 32.

The maximum height of the fin 32 (a peak 52) may occur in the downstream half of the fin 32, the half of the fin 32 that is farther downstream in the longitudinal direction. The maximum width of the fin 32 may also occur in the downstream half of the fin 32. Thus the fin 32 builds up from an upstream end 54 (upstream of the peak 52), increasing relatively slowly (with relatively small slope) in its height and width until reaching its maximum height and width. Then the width and height reduce relatively quickly (with relatively large slope, larger than that on the upstream end 54) on a downstream end 56, downstream of the longitudinal location of maximum height and width (the peak 52). These upstream and downstream slopes may be constant or nearly so, or may vary with longitudinal location. The width and height are described above as single quantities, but it will be appreciated that a triangular cross-section shape that transitions smoothly to a flat wall portion does not necessarily have a single width, and the width may be understood as any suitable width, for example the width of the fin 32 at half of its height, for any given longitudinal location.

The fin 32 may have a maximum height that is greater than an expected boundary layer thickness of the flow, that is at least twice the boundary layer thickness, or that is 2-3 times the boundary layer thickness. This means that the fin 32 protrudes into a core of the flow, outside of the boundary layer. It will be appreciated that the fin 32 may have other heights relative to the thickness of the boundary layer.

The fin 32 may be aligned with the flow through the flow channel 34, for example such that the longitudinal extent (length) of the fin 32 is aligned with the flow direction. Such an alignment may cause flow to divert around the fin 32 symmetrically, the same on one side of the fin 32 as on the opposite side of the fin 32, for example. Aligning the fin 32 with the flow direction reduces the amount of drag engendered by the presence of the fin 32, and may improve the uniformity and predictability of the fin's effect on the flow within the inlet 20. Alternatively the fin 32 may have a different alignment within the inlet 20.

Figure 5:
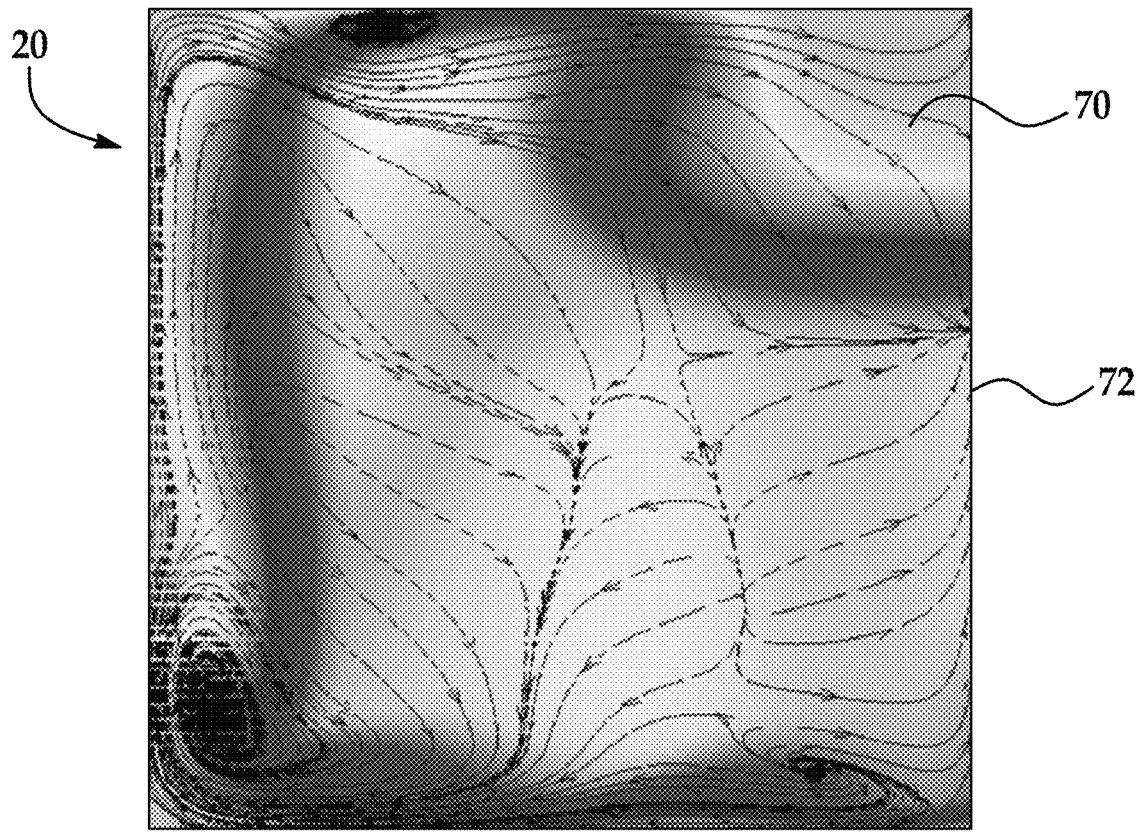
FIG. 5 is a cross-sectional view showing a flow pattern in an inlet without a fin.
Figure 6:
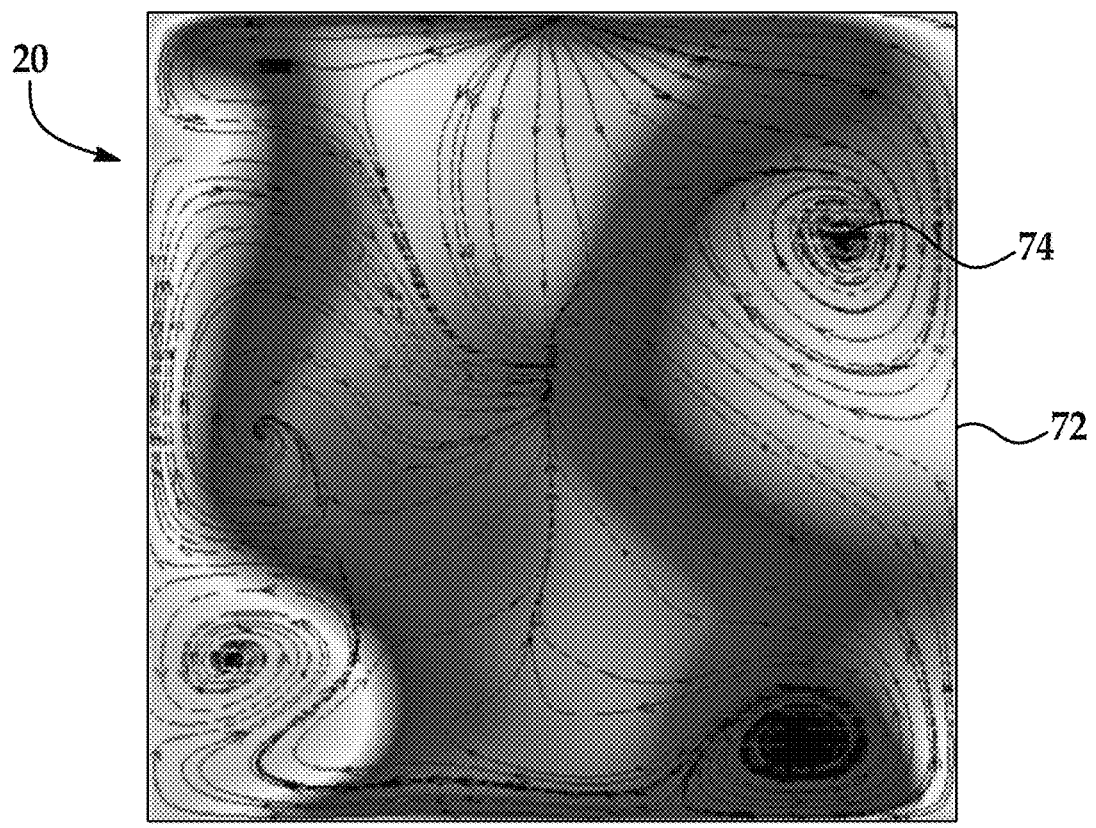
FIG. 6 is a cross-sectional view showing a flow pattern in an inlet with a fin, as in FIG. 3, illustrating the enhanced flow mixing.
Figure 7:
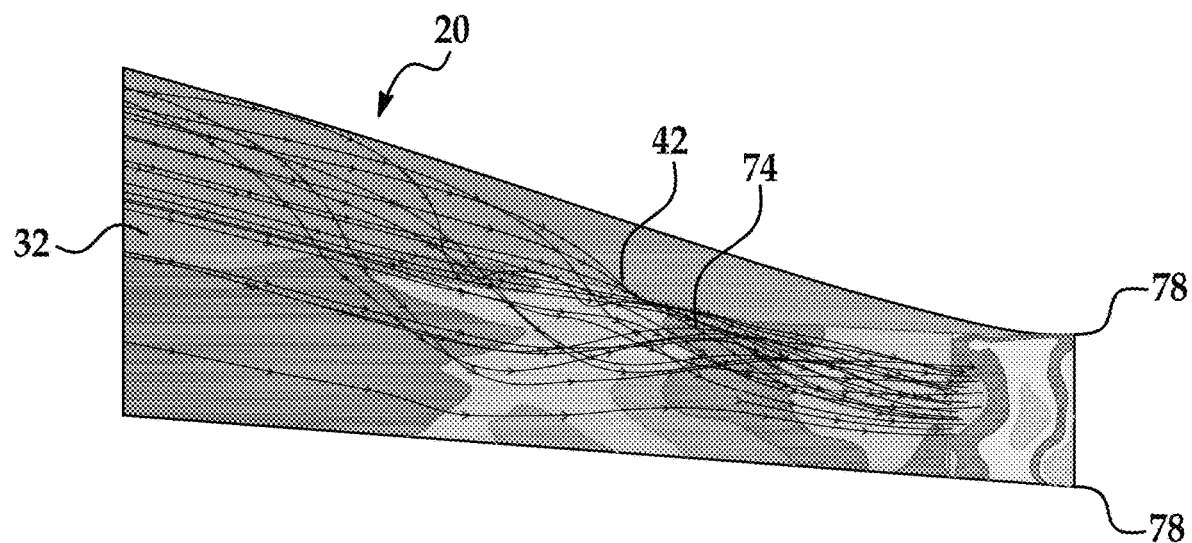
FIG. 7 is a side view illustrating flow patterns around and downstream in the inlet of FIG. 3.

FIGS. 5-7 illustrate how the presence of the fin 32 (FIG. 3) can affect the flow within the flow channel. The figures show the flow speed (Mach number) in the cross sections of the inlet 20 at the same longitudinal location (downstream of the fin 32) without (FIG. 5) and with (FIG. 6) the fin 32 in place. Without the fin 32 in place, the flow shown in FIG. 5 shows a low flow region 70 at the top of the inlet 20, along a centerline of symmetry 72 of the inlet 20. One way of approaching this problem in the past is to locally remove mass in this low-flow region so as to pull higher-momentum flow into the low-momentum region, but such an approach reduces efficiency (wasting some of the mass flow of air into the inlet 20) and can increase drag.

FIG. 6 shows what happens to the flow when the fin 32 (FIG. 3) is placed along the line of symmetry 72. The fin 32 causes the boundary layer in the vicinity of the fin 32 and the top of the inlet 20 near the line of symmetry 72 to roll into a vortex 74 that detaches from the top wall portion 42 and migrates into the core flow (the flow outside of the boundary layer region near the top wall portion 42). The mixing resulting from the presence of the fin 32 and this vortex 74 greatly reduces the size of the low-momentum region along the top wall (i.e. body-side) portion 42 near the line (plane) of symmetry 72.

FIG. 7 illustrates flow patterns in part of the inlet 20. The fin 32 may causes the upstream boundary layer to roll up and form a vortex pair. The pressure rise downstream of the fin 32 pushes the vortices, such as the vortex 74, away from the wall portion 42 and into the core of the flow. Thus the boundary layer may aggregate and then separate from the wall surface as a counter-rotating vortex pair. This may occur as part of an interaction between a cowl shock and a vortex downstream of the fin 32.

The use of the fin 32 allows flow mixing to be tailored, with the size (height, width, and/or length, as well as other geometric parameters) of the fin 32 related to the amount of flow mixing that occurs, and the resulting reduction in low-momentum regions of the flow channel. Avoiding the use of a boundary layer diverter or bleed may have one or more advantages, such as lower drag, higher mass capture, lower weight for the engine, potential for higher fuel volume, simplified manufacturing of the engine, and/or improving other characteristics of the engine. In addition the engine 12 (FIG. 2) may have improved operability, for example being able to operate over a wider range of conditions. The engine 12 may also have more uniform boundary layer separation with the shock train in the isolator 22 (FIG. 2), as a result of the presence of the fin 32. The circulation of flow in the core of the flow channel 34 (outside of the boundary layer), such as caused by the vortex 74, can promote fuel mixing, which may help in performance of the combustor 24 (FIG. 2), such as in a ramjet or scramjet combustor.

Some bleeding of flow may be used in addition to the fin 32 (or a fin or fins of other configuration/orientation). For example some flow may be bled away from one or more corners, such as the corners 78 (FIG. 7), so as to mitigate corner boundary layer buildup and promote inlet self-starting.

Many variations are possible in the configuration and/or placement of the fin (or multiple fins). A fin may be placed so as to cause flow mixing to put momentum in a low-momentum region, such as at the top of the inlet (as in the illustrated embodiment). Other configurations may be used to address other low-momentum regions, for example creating flow vortices that put momentum into corners of an inlet. There may be multiple fins, for example up to three fins, in different parts of the inlet, to achieve different effects. Some specific variations are shown in additional figures and described below, and various features from the various embodiments and variants described herein may be combined where appropriate to produce many of the advantages described elsewhere in this application.

As another alternative, there may be more than three fins, to achieve any of a variety of effects on the flow. For example, there may be six fins, one in each corner of the inlet, and a pair of additional fins on one inner side wall, between an adjacent pair of the corners. Many other configurations are possible.

Figure 8:
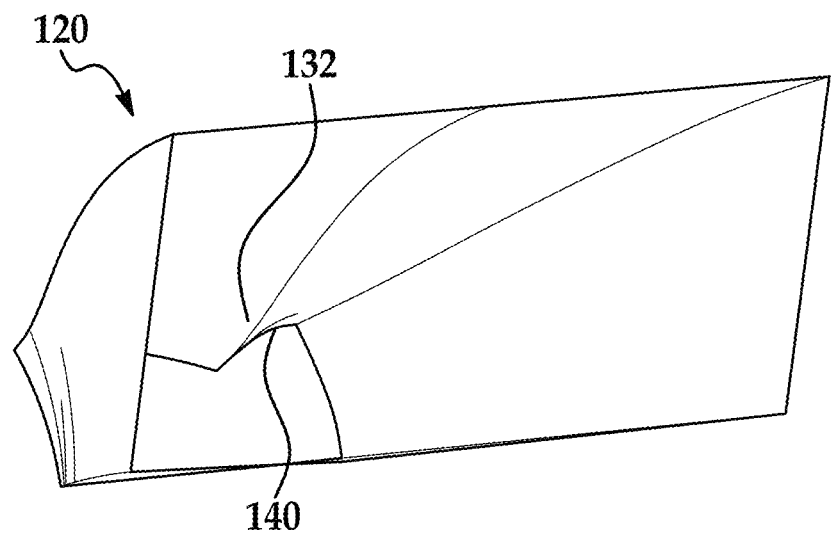
FIG. 8 is an oblique view of an alternate embodiment inlet of the invention.

FIG. 8 shows an inlet 120 that has a fin 132 that extends all the way to a downstream end or throat 140 of the inlet 120. Reducing the boundary layer height in the region of maximum pressure within the inlet reduces the probability of flow separation. If the region of maximum pressure is within the throat region, as it usually is, an extension of the fin aftward into the throat can be beneficial by helping to reduce the probability of flow separation.

Figure 9:
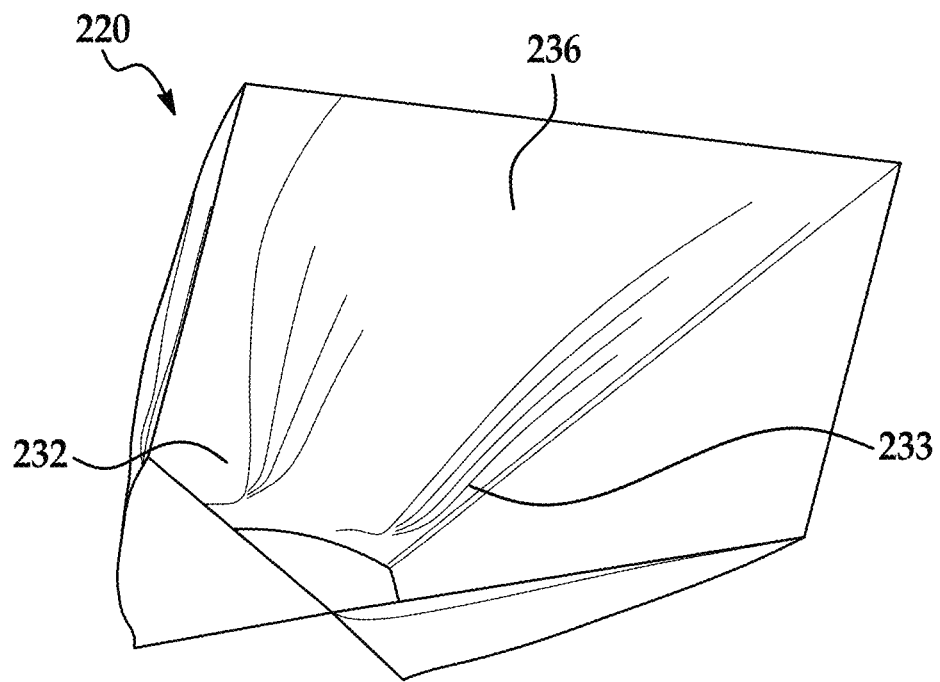
FIG. 9 is an oblique view of another alternate embodiment inlet of the invention.

FIG. 9 shows an inlet 220 that has a pair of fins 232 and 233 that are on the same wall inner surface 236. The fins 232 and 233 provide much of the same advantages of the fin 32 (FIG. 3), while in addition providing more flow mixing directed toward the upper corners of the inlet 220. More than one fin may be beneficial in wide, higher aspect ratio inlets, where the influence of a single fin would be inadequate to manage the full side-to-side extent of the boundary layer.

As a variant to the inlet 220 (FIG. 9), an inlet could have multiple fins, with the fins on different walls of a rectangular inlet. While the fins shown blend smoothly into the inlet walls, this is not necessary, and alternatively the fin or fins may protrude from a wall or walls with a discontinuity in slope or a sudden change in slope.

Figure 10:
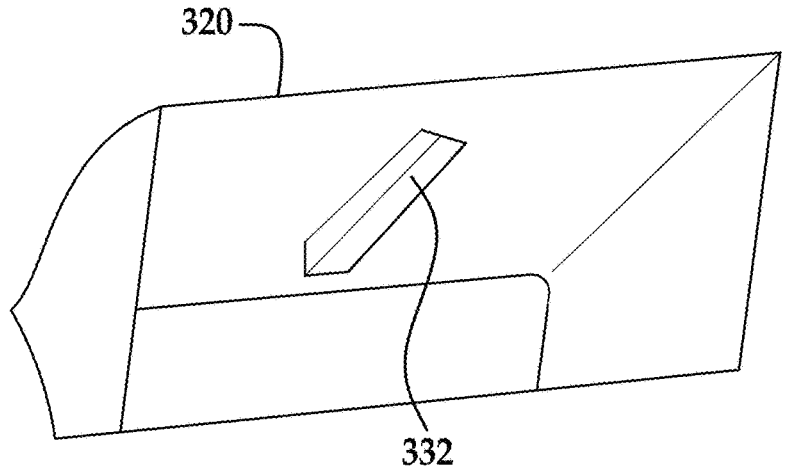
FIG. 10 is an oblique view of still another alternate embodiment inlet of the invention.

FIG. 10 shows another variant, an inlet 320 which has a movable fin 332. The fin 332 may be moved to reconfigure it within the inlet 320, to provide different effects and/or to accommodate different situations (Mach number, angle of attack, altitude, etc.). The fin 332 may be rotated and/or translated relative to the rest of the inlet 320. For example the fin 332 may be rotated relative to the general direction through the inlet, and/or to move the fin 332 into or out of the flow channel defined by the inlet 320.

Figure 11:
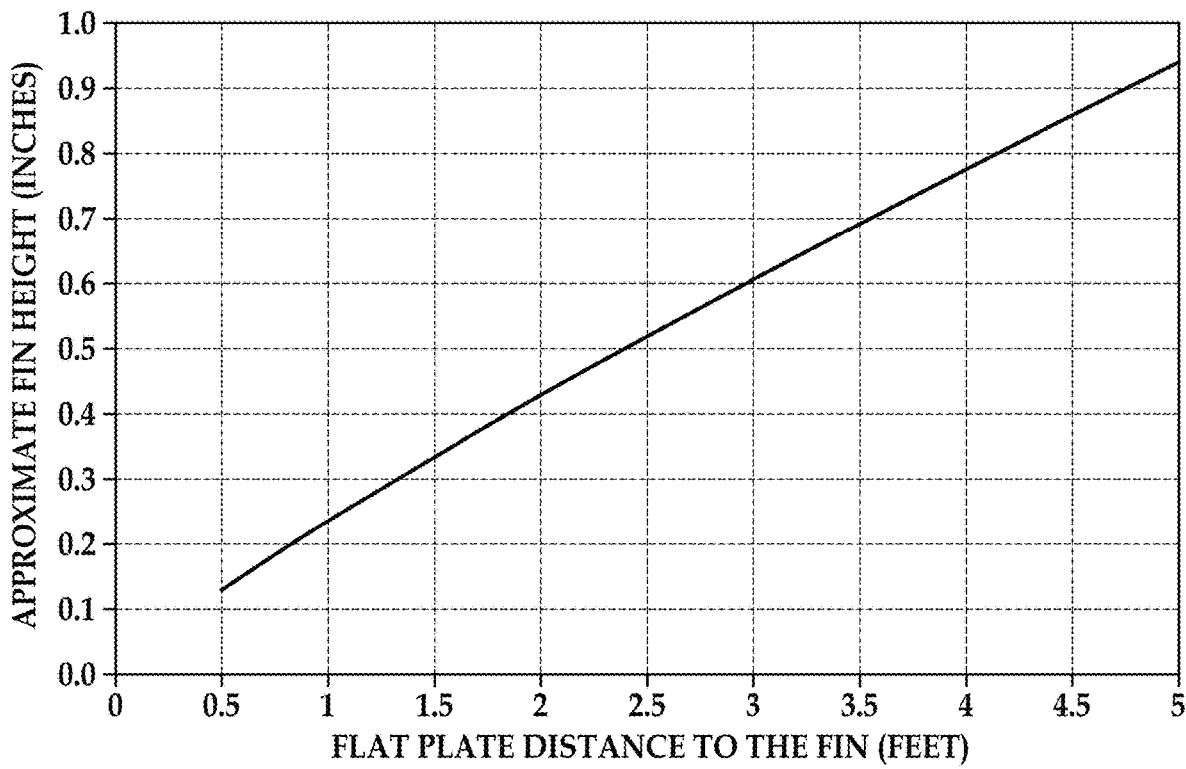
FIG. 11 is a graph showing a fin height versus distance along a flow plate for an example flow condition.

FIG. 11 is a graph showing a fin height versus distance along a flow plate for an example flow condition, with the fin sized to provide a height greater than a boundary layer thickness at the location in question. It is advantageous for the fin height to be greater than the boundary layer height at the location of the fin to be effective. The boundary layer height is a function of the velocity of the airframe, the altitude the airframe will be operating, the distance between where the boundary layer begins and the location of the fin, the amount of compression occurring within the inlet, and whether the local boundary layer is laminar or turbulent. Typically, the boundary layer height would be determined through using computational fluid dynamics to predict the boundary layer state at the fin location. However, to obtain a rough estimate of the minimum fin height, simple boundary layer correlations can be used. A simple, turbulent boundary layer correlation for boundary layer is as follows:

$$\delta = \frac{0.16x}{\text{Re}_x^{1/7}} \quad (1)$$

where the boundary layer height ($\delta$) is a function of the distance between where the boundary layer begins and the location of the fin (x) and the freestream Reynolds number $\text{Re}_x$. The Reynolds number is calculated from:

$$\text{Re}_x = \frac{\rho V x}{\mu} \quad (2)$$

The Reynolds number $\text{Re}_x$ is a function of the freestream density ($\rho$), the freestream velocity (V), and the freestream viscosity ($\mu$). The values of $\rho$, V, and $\mu$ are known if the designer selects the design Mach number and altitude that the airframe will operate. The above relations were used to calculate an example minimum fin height, assuming Mach 3 conditions, a dynamic pressure of 1000 psf, and the 1976 Standard Atmosphere. The values shown in FIG. 11 are not generally applicable, and should be taken only as a qualitative indication of how the fin height would be determined so as to extend beyond the boundary layer thickness.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A flight vehicle comprising:
a fuselage; and
an engine mechanically coupled to the fuselage;
wherein the engine includes:
an air inlet;
an isolator downstream of the air inlet; and
a combustor downstream of the isolator;
wherein the air inlet compresses incoming airflow through a flow channel defined by the air inlet, down to a throat of minimum cross-section area;
wherein the air inlet includes a fin protruding into the flow channel and extending from a leading edge of a top surface of an inner wall of the air inlet that defines the flow channel, with at least part of the fin upstream of the throat;
wherein the fin protrudes into the flow channel to a maximum height of at least a boundary layer thickness and at most three times the boundary layer thickness of the airflow at a location of the fin, along the inner wall of the inlet; and
wherein the fin has a spine and curved walls on either side of the spine, with the maximum height of the fin at the spine.

2. The flight vehicle of claim 1, wherein all of the fin is upstream of the throat.

3. The flight vehicle of claim 1, wherein the fin extends into the throat.

4. The flight vehicle of claim 1, wherein there is only a single fin in the inlet.

5. The flight vehicle of claim 1, wherein there are a plurality of the fin in the inlet.

6. The flight vehicle of claim 5, wherein the plurality of the fin include a pair of the fin side by side on the inner wall.

7. The flight vehicle of claim 5, wherein there are no more than three of the fin in the inlet.

8. The flight vehicle of claim 1, wherein the fin creates vortices that cause local flow mixing around the fin.

9. The flight vehicle of claim 8, wherein the local flow mixing causes mixing between a flow in a boundary layer along the inner wall of the inlet, and a flow outside of the boundary layer, further away from the inner wall.

10. The flight vehicle of claim 1, wherein the inlet is rectangular or super-elliptical in cross-section.

11. The flight vehicle of claim 10, wherein the fin is located on a face of the inner wall of the inlet that is between two other inner walls of the inlet.

12. The flight vehicle of claim 1, wherein the fin has a triangular cross section shape, in a direction perpendicular to a flow direction through the inlet.

13. The flight vehicle of claim 1, wherein a height of the fin varies over a length of the fin.

14. The flight vehicle of claim 13, wherein the height of the fin varies more slowly in an upstream part of the fin that is upstream of the maximum height, than in a downstream part of the fin that is downstream of the maximum height.

15. The flight vehicle of claim 1, wherein the engine is a supersonic engine.

16. The flight vehicle of claim 1, wherein the curved walls are steeper close to the spine, and flatten out away from the spine.

17. The flight vehicle of claim 1, wherein the fin protrudes into the flow channel to the maximum height of at least twice the boundary layer thickness of the airflow at the location of the fin, along the inner wall of the inlet.

18. The flight vehicle of claim 1, wherein the maximum height of the fin and a maximum width of the fin both occur in a downstream half of the fin.

19. The flight vehicle of claim 1, wherein the fin causes a boundary layer to aggregate and then separate from the inner wall as a counter-rotating vortex pair.

20. The flight vehicle of claim 1, wherein the spine is centered along a center width of the air inlet.

21. The flight vehicle of claim 1, wherein the inner wall of the air inlet includes a bottom surface opposite the top surface and the bottom surface includes a V-shaped cut out.

* * * * *